US012585704B2

(12) United States Patent
Samuel et al.

(10) Patent No.: US 12,585,704 B2
(45) Date of Patent: Mar. 24, 2026

(54) RULE-BASED SIDEBAND DATA COLLECTION IN AN INFORMATION HANDLING SYSTEM

(71) Applicant: DELL PRODUCTS L.P., Round Rock, TX (US)

(72) Inventors: Balasingh Samuel, Round Rock, TX (US); Travis North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 18/444,887

(22) Filed: Feb. 19, 2024

(65) Prior Publication Data

US 2025/0265296 A1     Aug. 21, 2025

(51) Int. Cl.
*G06F 16/903*         (2019.01)
(52) U.S. Cl.
CPC .............................. *G06F 16/90335* (2019.01)
(58) Field of Classification Search
CPC ................................................. G06F 16/90335
USPC .......................................................... 707/758
See application file for complete search history.

(56) References Cited

U.S. PATENT DOCUMENTS

| | | | | |
|---|---|---|---|---|
| 2014/0358792 | A1* | 12/2014 | Berke .................. | G06Q 30/018 |
| | | | | 705/50 |
| 2022/0374221 | A1* | 11/2022 | Sayyed ................. | G06F 21/572 |
| 2022/0413585 | A1 | 12/2022 | Iyer et al. | |
| 2022/0414026 | A1 | 12/2022 | Iyer et al. | |
| 2022/0417117 | A1* | 12/2022 | Tayeb ..................... | H04L 41/28 |
| 2025/0085927 | A1* | 3/2025 | Sardegna .................. | G06F 7/76 |

OTHER PUBLICATIONS

English translation of CN 107615082A. 15 pages (Year: 2018).*
English Translation of KR 20050050184A (Year: 2006).*

* cited by examiner

*Primary Examiner* — Kimberly L Wilson
(74) *Attorney, Agent, or Firm* — Larson Newman, LLP

(57)         ABSTRACT

An information handling system includes an embedded controller that communicates with multiple components. The embedded controller receives complete collection rules for a collection of data associated with the components of the information handling system. The embedded controller begins an execution of a telemetry service. During the execution of the telemetry service, the embedded controller collects data associated with the components based on the complete collection rules. The embedded controller provides the collected data to a requesting component.

18 Claims, 3 Drawing Sheets

Information Handling System 102

Host Processor 110

Telemetry Service
140

GPU 116

TPM 118

Power
Supply Unit
120

EC 112

Telemetry Service
150

Memory/Buffer 152

NPU 122

VPU 124

Memory
126

Fan 128

Cloud Server 104

Processor 130

Telemetry
Service 132

200

202 — Start

204 — Create data collection rules

206 — Add an additional rules trigger event to the data collection rules

208 — Send the data collection rules to an embedded controller

210 — Receive the data collection rules

212 — Decode the data collection rules

214 — Collect data based on the data collection rules

216 — Provide the collected data

218 — End

RULE-BASED SIDEBAND DATA COLLECTION IN AN INFORMATION HANDLING SYSTEM

FIELD OF THE DISCLOSURE

The present disclosure generally relates to information handling systems, and more particularly relates to performing rule-based sideband data collection in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an embedded controller that may communicate with components. The embedded controller may receive complete collection rules for a collection of data associated with the components of the information handling system. The embedded controller may begin an execution of a telemetry service. During the execution of the telemetry service, the embedded controller may collect data associated with the components based on the complete collection rules. The embedded controller may provide the collected data to a requesting component.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
FIG. 1 is a block diagram of a portion of an information handling system according to at least one embodiment of the present disclosure.

FIG. 1 illustrates a system 100 including an information handling system 102 and a cloud server 104 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes a host processor 110, an embedded controller (EC) 112, a graphic processing unit (GPU) 116, a trusted platform module (TPM) 118, a power supply unit 120, a neural processing unit (NPU) 122, a virtual processing unit (VPU) 124, a memory 126, and a cooling fan 128. Cloud server 104 includes a processor 130, which in turn may execute a telemetry service 132. Host processor 110 may execute a telemetry service 140, and EC 112 may execute a telemetry service 150. EC 112 may include a memory/buffer 152. Information handling system 102 and cloud server 104 may both include other components without varying from the scope of this disclosure.

During operation of information handling system 102, EC 112 may run in parallel to host processor 110, such that the EC is a sideband processor with respect to the host processor. For example, EC 112 may operate as a sideband processor such that the EC may perform operations separate from host processor 110. In an example, host processor 110 may execute any suitable operations or applications that may need data sets associated with components of information handling system 102. For example, host processor 110 may perform or execute a workload optimization, recommenders, a remediation, a predictive health assessment, or the like. In certain examples, these applications may require the periodic collection of data sets for several subsystems or components of information handling system 102. The data sets of the components in information handling system 102 may be platform-level data sets. In an example, the subsystems or components may include, but are not limited to, GPU 116, TPM 118, power supply unit 120, NPU 122, VPU 124, memory 126, and cooling fan 128.

In certain examples, the type of data, the frequency of collection, start time, end time, trigger points, duration, data budget, or the like may vary based on the use cases of information handling system 102. In an example, the collected data may be optimized to provide enhanced runtime performance of the components in information handling system 102, such as increasing raw performance or power efficiency within one or more of the components. In an example, EC 112 may perform multiple operations including, but not limited to, power sequencing, power controls, startup configurations, subsystem management, and subsystem health assessment. Based on these operations, EC 112 may have access to key platform-level data sets and run in parallel to host processor 110. Based on EC 112 having access to the key platform-level data sets, the EC may be able to collect requested platform-level data from the components of information handling system 102.

In previous information handling systems, the telemetry service running on the host processor may send multiple command sets to multiple processing units via multiple communication interfaces. In these previous information handling systems, the host processors must execute too many command/data exchange operations with the EC and other specialized processors to instrument retrieval of the platform-level data. However, in the previous information handling system, the execution of the many command/data exchange operations, requires a lot of processor cycles and energy consumption in the host processor. Information handling system 102 may be improved by host processor 110 and EC 112 implementing an intelligently optimized data collection scheme.

In certain examples, telemetry service 140 may run on host processor 110 as any suitable service, such as a windows service. In an example, host processor 110 may execute telemetry service 140 to perform one or more suitable operations. In certain examples, telemetry service 132 may run on processor 130 of cloud server 104. Processor 130 may execute telemetry service 132 to perform one or more suitable operations.

During the execution of telemetry service 132 of processor 130 or telemetry service 140 by host processor 110, one or more data collection rules may be built. Execution of telemetry service 132 by processor 130 and execution of telemetry service 140 by host processor 110 may perform substantially the same operations to build the data collection rules. For clarity and brevity, the operations of building data collection rules and adding additional rules trigger events will be described only with respect to the execution of telemetry service 140 by host processor 110. In certain examples, the data collection rules may be any suitable rules to control or set up how data is collected for different components of information handling system 102, such as GPU 116, TPM 18, power supply unit 120, NPU 122, VPU 124, memory 126, and fan 128. For example, the collection rules may include, but are not limited to, times of day to collect the data, the components for data collection, and an interval for the data collection.

Exemplary collection rules may include a time period for the collection of data, such as 8:00 AM to 10:00 AM. In certain examples, the time period may also be set based on different days, such as every day of the week, every other day, particularly assigned days, or the like. The exemplary collection rules may also include different interval frequencies for collecting the data and the intervals may differ from one component to another within information handling system 102. For example, collection rules may indicate that data associated with the speed of fan 128 should be collected at a particular interval, such as every ten seconds, every twelve seconds, every fifteen seconds, every twenty seconds, or the like.

In certain examples, the collection rules may also indicate that data associated with a temperature of a junction of a central processing unit (CPU), such as processor 110, should be collected at a different particular interval. In an example, the interval for collecting the data at the junction of the CPU may be any suitable interval including, but not limited to, every two seconds, every five seconds, and every seven seconds. The collection rules may further indicate that data associated with a hard drive, such as memory 126, should be collected at particular intervals. In an example, the data for memory 126 may be any suitable data, such as hard drive self-monitoring, analysis, and reporting technology (SMART) data. In certain examples, the data for memory 126 may be collected at any suitable interval, such as every forty-five seconds, every sixty seconds, every ninety seconds, or the like.

In an example, the collection rules may also indicate that data associated with the total system power, the alternating current status, and battery status for information handling system 102. This data may be retrieved or collected from power supply unit 120, and the collection rules may set the data collection interval to every twenty seconds, every twenty-five seconds, every thirty seconds, every forty-five seconds, or the like. In an example, the performance of the collection rule may be determined from an aggregated frequency, such as effective clock derived by the frequency being averaged over the time domain of the sampling period. For example, the collection rule may indicate that the data associated with processor 110, NPU 122, and VPU 124 may be at average frequency rate, such as an average of every three seconds, an average of every five seconds, an average of every ten seconds, or the like.

After creation of the collection rules, host processor 110, via telemetry service 140, may add one or more additional rule trigger events to the data collection rules. In an example, the additional rule trigger events may identify one or more events that may result in additional data collection rules being enacted. An exemplary additional rule trigger event may be determining whether the temperature of processor 110 reaches a particular value and remains at or above that temperature for a predetermined amount of time. For example, the additional rule trigger event may be that the temperature of processor 110 reaches ninety-five degrees Celsius and remains at or above that temperature for at least twenty seconds. If the trigger event occurs, the additional collection rules may be enacted. In an example, the additional collection rules may be to collect data sets associated with the temperature of memory 126 and the frequency of processor 110 for a particular amount of time or period time, such as five minutes, seven minutes, ten minutes, or the like. In certain examples, the additional rules may further include that during this period of time that the temperature of memory 126 is to be collected every ten seconds, every fifteen seconds, or the like, and that data associated with the frequency of processor 110 is to be collected every thirty seconds, forty seconds, sixty seconds, or the like.

In an example, host processor 110 may encode complete collection rules, such as the combination of the collection rules and the additional rules trigger event, and by doing so may reduce the size of the collection rules for transmission to EC 112. In response to receiving the encoded complete collection rules, EC 112 may store the encoded complete collection rules in memory 152. In an example, the encoded complete collection rules may occupy or fill a smaller portion of memory 152 as compared to the complete collection rules if the rules were not encoded.

In an example, processor 130, via telemetry service 132, may provide encoded complete collection rules from cloud server 104 to EC 112. In this example, cloud-based telemetry service 132 may push the complete collection rules directly to EC 112 via a sideband network communication. This transmission of collection rules from cloud server 104 to EC 112 may enable the data collection process to completely bypass host processor 110, which in turn may prevent CPU cycles and energy consumption of processor 110 from be utilized in the data collection process. In certain examples, processor 130 of cloud server 104 and EC 112 may provide different security services during the transmission of the data collection rules and the collected data to protect the data and the interface between the cloud server and the EC.

In certain examples, when embedded controller 112 receives the complete data collection rules, such as the combination of the original data collection rules and the additional rules trigger event, from host processor 110, the data collection is an on-the-box data collection. When embedded controller 112 receives the complete data collection rules from processor 130 of cloud server 104, the data collection is an on-the-cloud data collection.

In an example, EC 112 may retrieve the collection rules from memory/buffer 152 and decode the collection rules prior to performing actions associated with the collection rules. In certain examples, telemetry service 150 of EC 112 may collect platform-level data for the components of information handling system 102 based on the data collection rules and the additional rules trigger event within the complete collection rules. For example, telemetry service 150 may perform one or more operations to collect data associated with the components of information handling system 100 based on collection rules, such as times of day to collect the data, the components for data collection, an interval for the data collection, or the like. Telemetry service 150 may also determine whether the trigger event has occurred. In response to the detection of the trigger event, telemetry service 150 may collect additional platform-level data based on the collection rules identified in the additional collection rules.

In an example, EC 112, via telemetry service 150, may store or buffer the collected data in memory 152 of the EC. Telemetry service 150 may collect the data in any suitable manner, such as through communication interfaces already established between EC 112 and the components of information handling system 102. In certain examples, the collection rules may also include data to indicate how often the collected platform-level data should be provided to the requesting device, such as host processor 110 or processor 130 of cloud server 104. EC 112, via telemetry service 150, may provide the collected platform-level data to the requesting device at the interval identified in the collection rules.

If EC 112 receives updated data collection rules, the updated rules may be stored in memory 152. In an example, the updated collection rules may be written to memory 152 in any suitable manner. For example, the updated collection rules may be stored in a memory space of memory 152 other than the memory space of the original collection, written over the original collection rules, or the like. After storing the updated collection rules, EC 112 may collect, store, and provide the platform-level data based on the updated collection rules.

In certain examples, host processor 110 may not perform any operations with respect to data collection beyond building the collection rules and adding the additional rules trigger event to form the complete collection rules. For example, host processor 110 may not execute the data collection operations but enable EC 112 to perform the operations. In certain examples, host processor 110 passing the main processing operations of the platform-level data collection to EC 112 may enable the data collection of the platform-level data with minimal CPU cycles and energy consumption of processor 110. In these examples, the energy or power consumption of processor 110 may be reduced based on multiple factors including, but not limited to, reducing the frequency that data is communicated over an interface between host processor 110 and EC 112. Based on the platform-level data collection for the components being performed in EC 112, the system performance impact may be reduced because the performance reduction within host processor 110.

Figure 2:
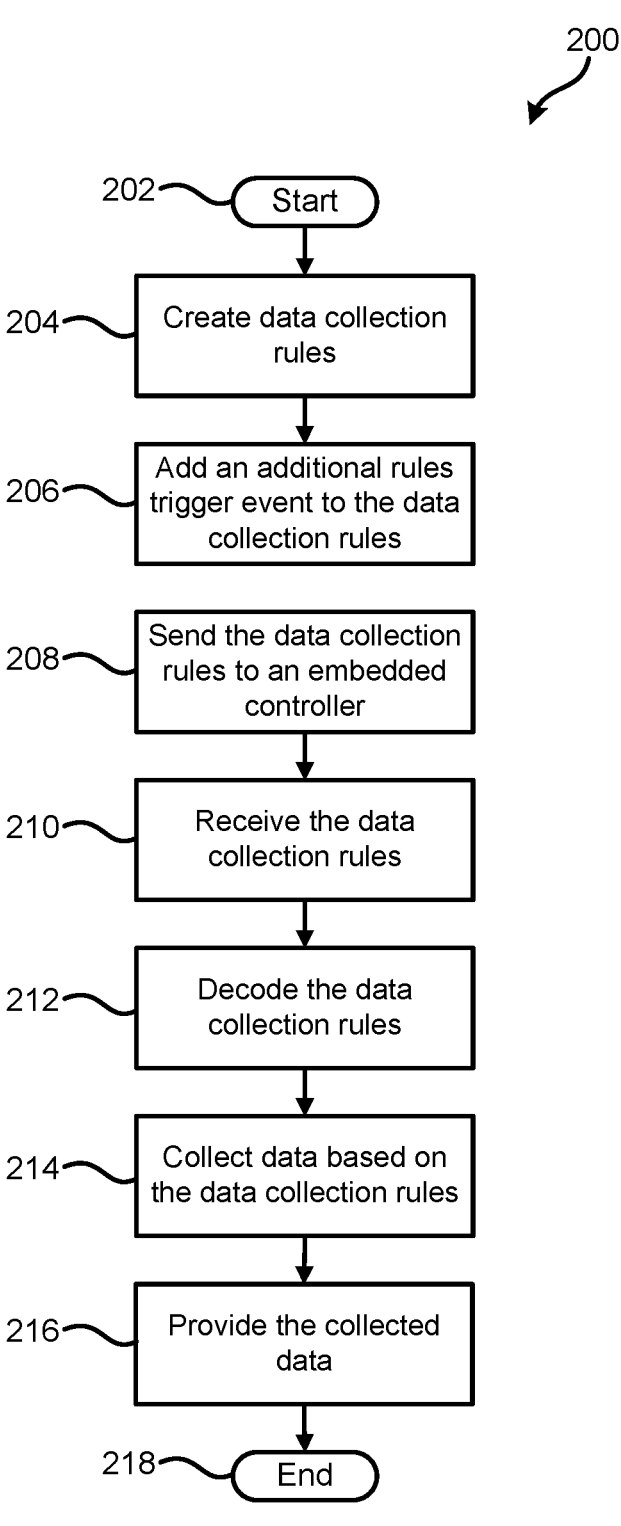
FIG. 2 is a flow diagram of a method for performing rule-based sideband data collection according to at least one embodiment of the present disclosure.

FIG. 2 is a flow diagram of a method 200 for performing rule-based sideband data collection according to at least one embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, host processor 110, embedded controller 112 and processor 130 of FIG. 1, or any other type of controller, device, module, processor, or any combination thereof, operable to employ all, or portions of, the method of FIG. 2.

At block 204, data collection rules are created. In an example, the data collection rules may be created by any suitable processor, such as a host processor of an information handling system, a processor in a cloud server, or the like. In certain examples, the data collection rules may be any suitable rules to control or set up how data is collected for different components of the information handling system. For example, the collection rules may include, but are not limited to, times of day to collect the data, the components for data collection, and an interval for the data collection. At block 206, an additional rules trigger event is added to the data collection rules. In an example, the additional rule trigger may identify a trigger event that may result in additional data collection rules being enacted.

At block 208, the data collection rules, and the additional rules trigger event are sent to an embedded controller of the information handling system. In certain examples, the data collection rules and the additional rules trigger events may be sent from the host processor of the information handling system or over a network from the cloud server. In an example, the data collection rules, and the additional rules trigger event may be encoded prior to transmission. The encoding of the data collection rules and the additional rules trigger event may enable proper transmission of the data collection rules and the additional rules trigger event.

At block 210, the data collection rules and additional rules trigger event are received at the embedded controller. In an example, when the embedded controller receives the data collection rules and the additional rules trigger event from the host processor, the data collection is an on-the-box data collection. When the embedded controller receives the data collection rules and the additional rules trigger event from the cloud server, the data collection is an on-the-cloud data collection.

At block 212, the data collection rules and the additional rules trigger event are decoded. In an example, the data collection rules and the additional rules trigger event may be decoded after the rules are retrieved from a memory of the embedded controller. The data collection rules and the additional rules trigger event may be utilized by the embedded controller to perform one or more operations to collect data associated with components of the information handling system. At block 214, data is collected based on the data collection rules and the additional rules trigger event. In certain examples, embedded controller may collect data based on the data collection rules and monitor for the additional rules trigger event. If the trigger event is detected, the embedded controller may collect data according to the additional rules. In an example, the embedded controller may store or buffer the collected data in the memory of the embedded controller. At block 216, the collected data is provided by the embedded controller and the flow ends at block 218. In an example, the embedded controller may provide the collected data to either the host processor of the information handling system or the processor of the cloud server.

Figure 3:
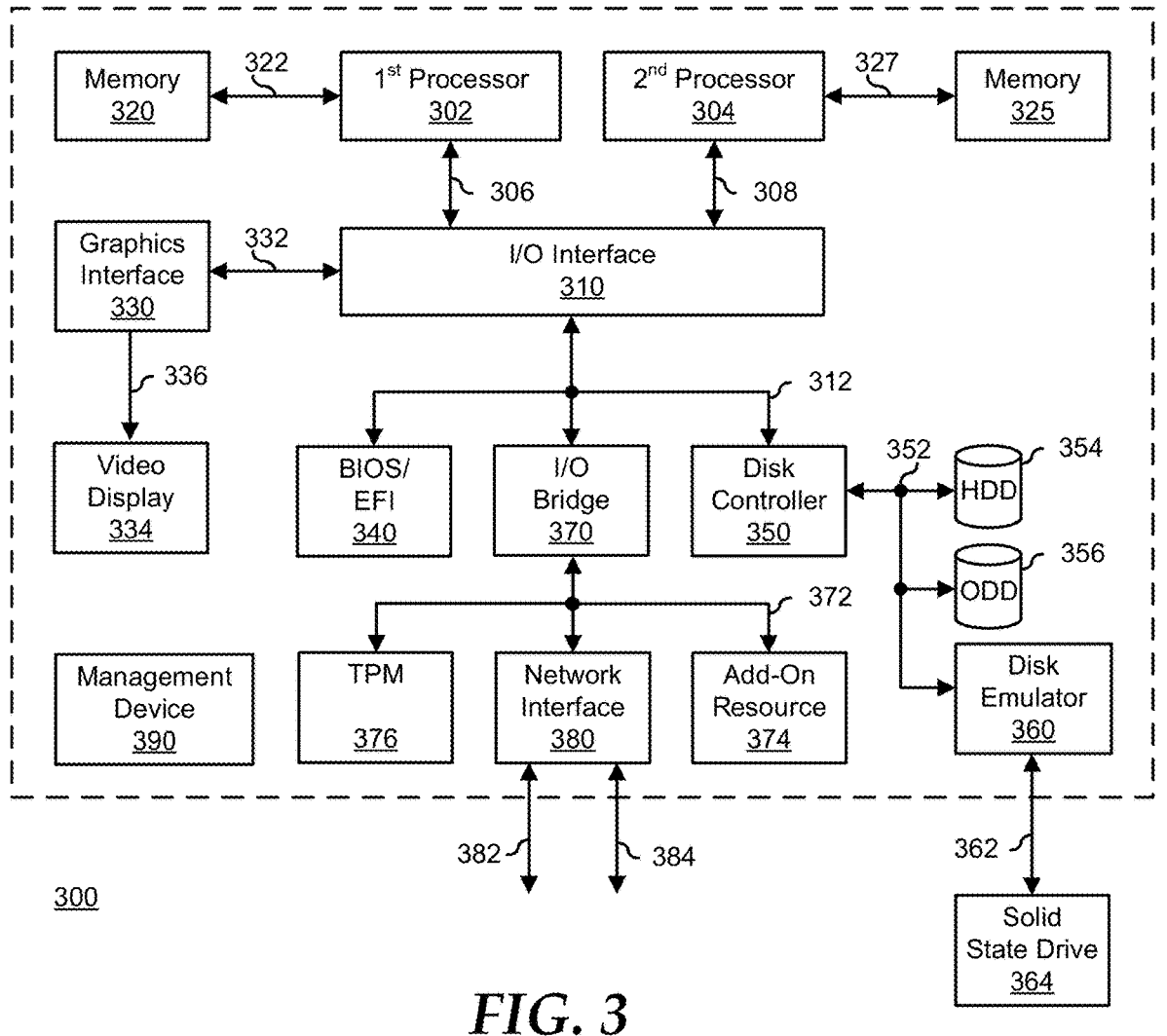
FIG. 3 is a block diagram of a general information handling system according to an embodiment of the present disclosure.

FIG. 3 shows a generalized embodiment of an information handling system 300 according to an embodiment of the present disclosure. Information handling system 300 may be substantially similar to information handling system 102 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332 and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 4394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312 or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300.

Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a plurality of components; and
an embedded controller configured to communicate with the components, the embedded controller to:
receive encoded complete collection rules for a collection of data associated with the components of the information handling system;
store the encoded complete collection rules in a memory of the embedded controller; and
during an execution of a telemetry service, the embedded controller further to:
decode the encoded complete collection rules to extract complete collection rules, wherein the complete collection rules includes a set of collection rules and an additional set of collection rules with a trigger event;
collect data associated with the components based on the complete collection rules;
provide the collected data to a requesting component; and
in response to the trigger event being detected, collect additional data based on the additional set of collection rules.

2. The information handling system of claim 1, wherein the embedded controller further to decode the complete collection rules prior to the collection of the data during the execution of the telemetry service.

3. The information handling system of claim 1, wherein prior to providing the collected data, the embedded controller further to store the collected data in a memory of the embedded controller.

4. The information handling system of claim 1, wherein the complete collection rules indicate times of day to collect the data, the components for data collection, and an interval for the data collection.

5. The information handling system of claim 1, wherein the reception of the complete collection rules is received from a cloud server.

6. The information handling system of claim 1, further comprising a host processor to provide the complete collection rules to the embedded controller.

7. The information handling system of claim 1, wherein the components include a power supply unit, a memory, a cooling fan, and a trusted platform module.

8. A method comprising:

receiving, by an embedded controller of an information handling system, encoded complete collection rules for a collection of data associated with a plurality of components in the information handling system;

storing the encoded complete collection rules in a memory of the embedded controller; and during an execution of a telemetry service:

decoding the encoded complete collection rules to extract complete collection rules, wherein the complete collection rules includes a set of collection rules and an additional set of collection rules with a trigger event;

collecting data associated with the components based on the complete collection rules;

providing the collected data to a requesting component; and in response to the trigger event being detected, collecting additional data based on the additional set of collection rules.

9. The method of claim 8, further comprising decoding the complete collection rules prior to the collection of the data during the execution of the telemetry service.

10. The method of claim 8 wherein prior to the providing of the collected data, the method further comprises storing, by the embedded controller, the collected data in a memory of the embedded controller.

11. The method of claim 8, wherein the complete collection rules indicate times of day to collect the data, the components for data collection, and an interval for the data collection.

12. The method of claim 8, wherein the complete collection rules is received from a cloud server.

13. The method of claim 8, wherein the complete collection rules is received from a host processor of the information handling system.

14. The method of claim 13, wherein the components include a power supply unit, a memory, a cooling fan, and a trusted platform module.

15. An information handling system comprising:

a host processor;

a plurality of components; and an embedded controller configured to operate as a side-band processor with respect to the host processor, the embedded controller to:

receive encoded complete collection rules for a collection of data associated with the components of the information handling system;

store the encoded complete collection rules in a memory of the embedded controller; and during an execution of a telemetry service, the embedded controller further to:

decode the encoded complete collection rules to extract complete collection rules, wherein the complete collection rules includes a set of collection rules and an additional set of collection rules with a trigger event;

collect data associated with the components based on the complete collection rules;

provide the collected data to a requesting component; and in response to the trigger event being detected, collect additional data based on the additional set of collection rules.

16. The information handling system of claim 15 wherein the embedded controller further to decode the complete collection rules prior to the collection of the data during the execution of the telemetry service.

17. The information handling system of claim 15, wherein the requesting component is the host processor.

18. The information handling system of claim 15, wherein the requesting component is a processor of a cloud server.

* * * * *